US012675813B2

(12) United States Patent
Oberemk et al.

(10) Patent No.: US 12,675,813 B2
(45) Date of Patent: Jul. 7, 2026

(54) GENERATING RECOMMENDATIONS FOR ADJUSTMENT ACTIONS USING A TRAINED MODEL OF AN ONLINE SYSTEM

(71) Applicant: Maplebear Inc., San Francisco, CA (US)

(72) Inventors: Mark Oberemk, Toronto (CA); Shaun Navin Maharaj, Vaughan (CA); Brent Scheibelhut, Toronto (CA)

(73) Assignee: Maplebear Inc., San Francisco, CA (US)

( * ) Notice: Subject to any disclaimer, the term of this patent is extended or adjusted under 35 U.S.C. 154(b) by 191 days.

(21) Appl. No.: 18/441,935

(22) Filed: Feb. 14, 2024

(65) Prior Publication Data

US 2025/0259222 A1      Aug. 14, 2025

(51) Int. Cl.
*G06Q 30/0601* (2023.01)
*G06Q 30/0204* (2023.01)

(52) U.S. Cl.
CPC ..... *G06Q 30/0631* (2013.01); *G06Q 30/0204* (2013.01); *G06Q 30/0633* (2013.01)

(58) Field of Classification Search
CPC ........... G06Q 30/0631; G06Q 30/0204; G06Q 30/0633
USPC ........................................................ 705/7.33
See application file for complete search history.

(56) References Cited

U.S. PATENT DOCUMENTS

| | | | | |
|---|---|---|---|---|
| 10,241,772 | B1 * | 3/2019 | Ning ................. | G06F 16/24578 |
| 2016/0299906 | A1 * | 10/2016 | Cartoon .............. | G06F 16/4387 |
| 2018/0218428 | A1 * | 8/2018 | Xie ...................... | G06Q 10/067 |
| 2020/0250731 | A1 * | 8/2020 | Soohoo .................. | G06N 5/022 |

(Continued)

FOREIGN PATENT DOCUMENTS

| | | | | | |
|---|---|---|---|---|---|
| WO | WO-2014075081 | A1 * | 5/2014 | ......... | G06Q 30/0631 |
| WO | WO-2020122669 | A1 * | 6/2020 | ............. | G06N 3/098 |
| WO | WO-2022235637 | A1 * | 11/2022 | ............. | H04N 23/90 |

OTHER PUBLICATIONS

Kaghu et al (Analysis of pricing decision for substitutable and complementary products with a common retailer), Dec. 2016, Pacific Science Review A: Natural Science and Engineering, vol. 18, Issue 3, Nov. 2016, pp. 190-202, (Year: 2016).*

(Continued)

*Primary Examiner* — Romain Jeanty

(74) *Attorney, Agent, or Firm* — Fenwick & West LLP

(57)      ABSTRACT

A trained model is used to generate market adjustment recommendations for a retailer associated with an online system. Upon displaying an item to a user of the online system for replacing an originally requested item and collecting user's engagement data in relation to the replacement item, the online system accesses a market adjustment model that is trained to generate a score for the user indicative of an affinity of the user in relation to the replacement item and generate one or more market adjustment recommendations for the retailer. The online system applies the market adjustment model to generate, based on the engagement data, behavioral information of the user and/or contextual information associated with the user, the score for the user and the one or more market adjustment recommendations for the retailer. The online system provides the one or more market adjustment recommendations to a computing system associated with the retailer.

19 Claims, 4 Drawing Sheets

(56) References Cited

U.S. PATENT DOCUMENTS

| 2021/0233145 | A1* | 7/2021 | Joshi | ........................ | G06N 3/09 |
| 2022/0383384 | A1* | 12/2022 | Bronicki | ............ | G06Q 30/0241 |
| 2022/0383401 | A1* | 12/2022 | Bronicki | ............ | G06Q 30/0639 |

OTHER PUBLICATIONS

S. Rao and L. Zhang, "The Algorithms That Make Instacart Roll: How Machine Learning And Other Tech Tools Guide Your Groceries From Store To Doorstep," in IEEE Spectrum, vol. 58, No. 3, pp. 36-42, Mar. 2021, doi: 0.1109/MSPEC.2 (Year: 2021).*
Sharath et al "How machine learning and other tech tools guide your groceries from store to doorsteps", Mar. 2021, Spectrum.IEEE.org , pp. 1-7 (Year: 2021).*

\* cited by examiner

Online Concierge System 140

Data Collection Module 200

Content Presentation Module 210

Order Management Module 220

Machine Learning Training Module 230

Data Store 240

Item Replacement Module 250

Data Gathering Module 260

Market Adjustment Module 270

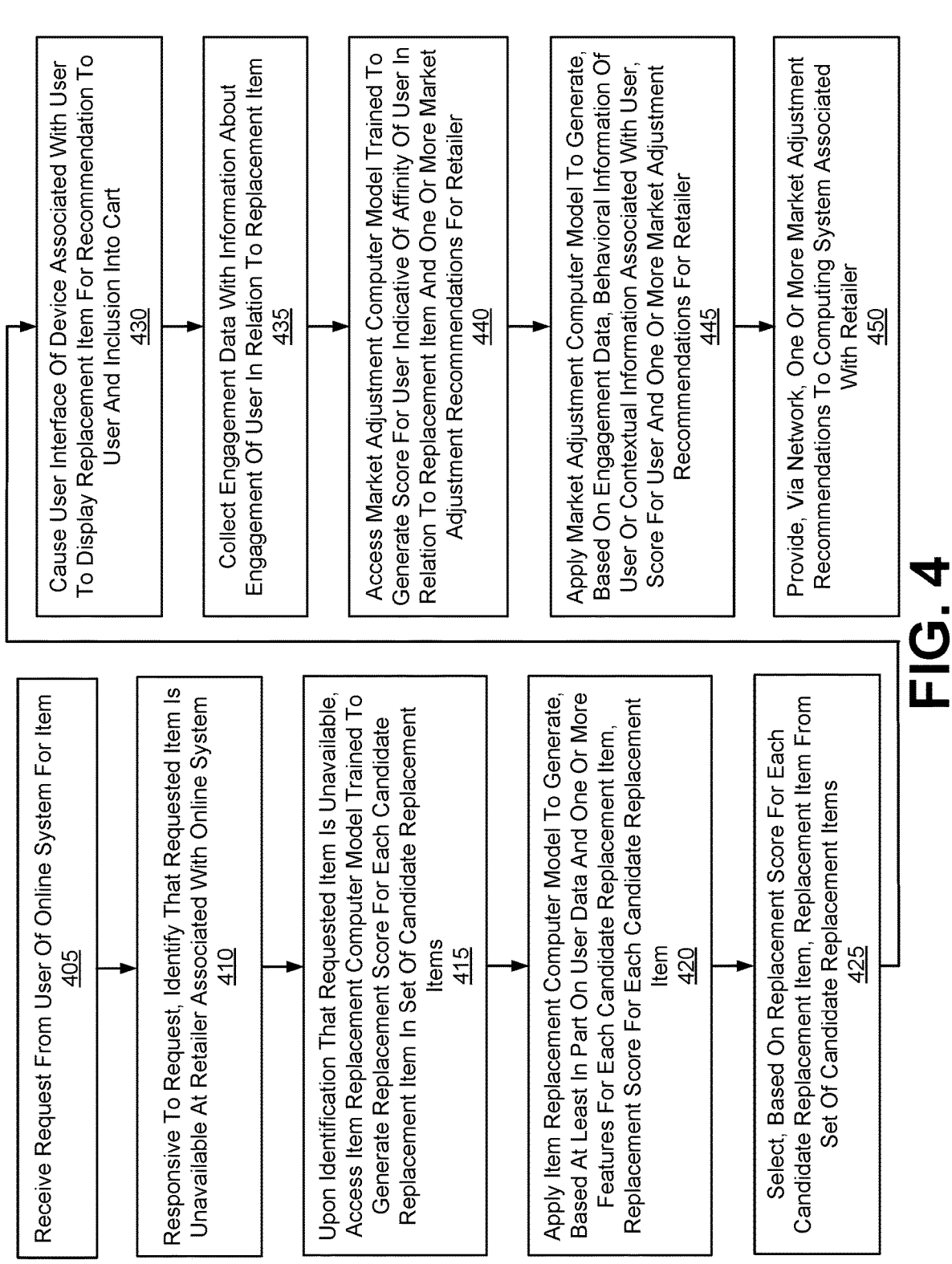

Receive Request From User Of Online System For Item
405

Responsive To Request, Identify That Requested Item Is Unavailable At Retailer Associated With Online System
410

Upon Identification That Requested Item Is Unavailable, Access Item Replacement Computer Model Trained To Generate Replacement Score For Each Candidate Replacement Item In Set Of Candidate Replacement Items
415

Apply Item Replacement Computer Model To Generate, Based At Least In Part On User Data And One Or More Features For Each Candidate Replacement Item, Replacement Score For Each Candidate Replacement Item
420

Select, Based On Replacement Score For Each Candidate Replacement Item, Replacement Item From Set Of Candidate Replacement Items
425

Cause User Interface Of Device Associated With User To Display Replacement Item For Recommendation To User And Inclusion Into Cart
430

Collect Engagement Data With Information About Engagement Of User In Relation To Replacement Item
435

Access Market Adjustment Computer Model Trained To Generate Score For User Indicative Of Affinity Of User In Relation To Replacement Item And One Or More Market Adjustment Recommendations For Retailer
440

Apply Market Adjustment Computer Model To Generate, Based On Engagement Data, Behavioral Information Of User Or Contextual Information Associated With User, Score For User And One Or More Market Adjustment Recommendations For Retailer
445

Provide, Via Network, One Or More Market Adjustment Recommendations To Computing System Associated With Retailer
450

FIG. 4

GENERATING RECOMMENDATIONS FOR ADJUSTMENT ACTIONS USING A TRAINED MODEL OF AN ONLINE SYSTEM

BACKGROUND

Present-day online systems, such as online concierge systems, often deal with situations when items requested by users are unavailable at retailers' stores, which typically has negative impact to retailers. For example, retailers associated with online systems often lose sales to competing brands due to a lack of stock for certain "high demand" items. On the other hand, the unavailability of certain items at the retailer's stores may be an opportunity to get an insight into some other contextual data related to users of the online systems. For example, when a certain item requested by a user of an online system is not available at retailer's stores, the user may select a "close enough" alternative item or may use this opportunity to try some new item. Hence, when using an online system for item delivery, a core element in a fulfillment flow is for the user to select most suitable items for replacing missing items. This can be an ideal moment to gather user preferences as expressed by their "second choice" decisions that can then be correlated with other information about the user to create market research around new items and decisions. The conventional solution is to poll users for their preferences, which is expensive and not necessarily aligned with actual actions as people do not always report their intended actions accurately. Additionally, this information cannot be gathered from observing actions in an in-store context, because it cannot be captured and processed at a large enough scale as required by the online system to draw such conclusions.

SUMMARY

Embodiments of the present disclosure are directed to utilizing a trained computer model to generate recommendations for adjustment actions (e.g., market adjustment actions) for a retailer associated with an online system (e.g., online concierge system) based on interaction of a user of the online system in relation to one or more recommended replacement items.

In accordance with one or more aspects of the disclosure, the online system receives a request from the user for an item. Responsive to the request, the online system identifies that the requested item is unavailable at a retailer associated with the online system. Upon the identification that the requested item is unavailable, the online system accesses an item replacement computer model of the online system, wherein the item replacement computer model is trained to generate a replacement score for each candidate replacement item in a set of candidate replacement items. The online system applies the item replacement computer model to generate, based at least in part on user data associated with the user and one or more features for each candidate replacement item in the set of candidate replacement items, the replacement score for each candidate replacement item. The online system selects, based on the replacement score for each candidate replacement item, a replacement item from the set of candidate replacement items. The online system causes a user interface of a device associated with the user to display the replacement item for recommendation to the user and inclusion into a cart. The online system collects engagement data with information about an engagement of the user in relation to the replacement item. The online system accessing a market adjustment computer model of the online system, wherein the market adjustment computer model is trained to generate a score for the user indicative of an affinity of the user in relation to the replacement item and one or more market adjustment recommendations for the retailer. The online system applies the market adjustment computer model to generate, based on at least one of the engagement data, behavioral information of the user or contextual information associated with the user, the score for the user and the one or more market adjustment recommendations for the retailer. The online system provides, via a network, the one or more market adjustment recommendations to a computing system associated with the retailer prompting the retailer to perform one or more market adjustment actions.

BRIEF DESCRIPTION OF THE DRAWINGS

FIG. 4 is a flowchart for a method of using a trained computer model to generate market adjustment recommendations for a retailer associated with an online concierge system, in accordance with one or more embodiments.

DETAILED DESCRIPTION

Figure 1:
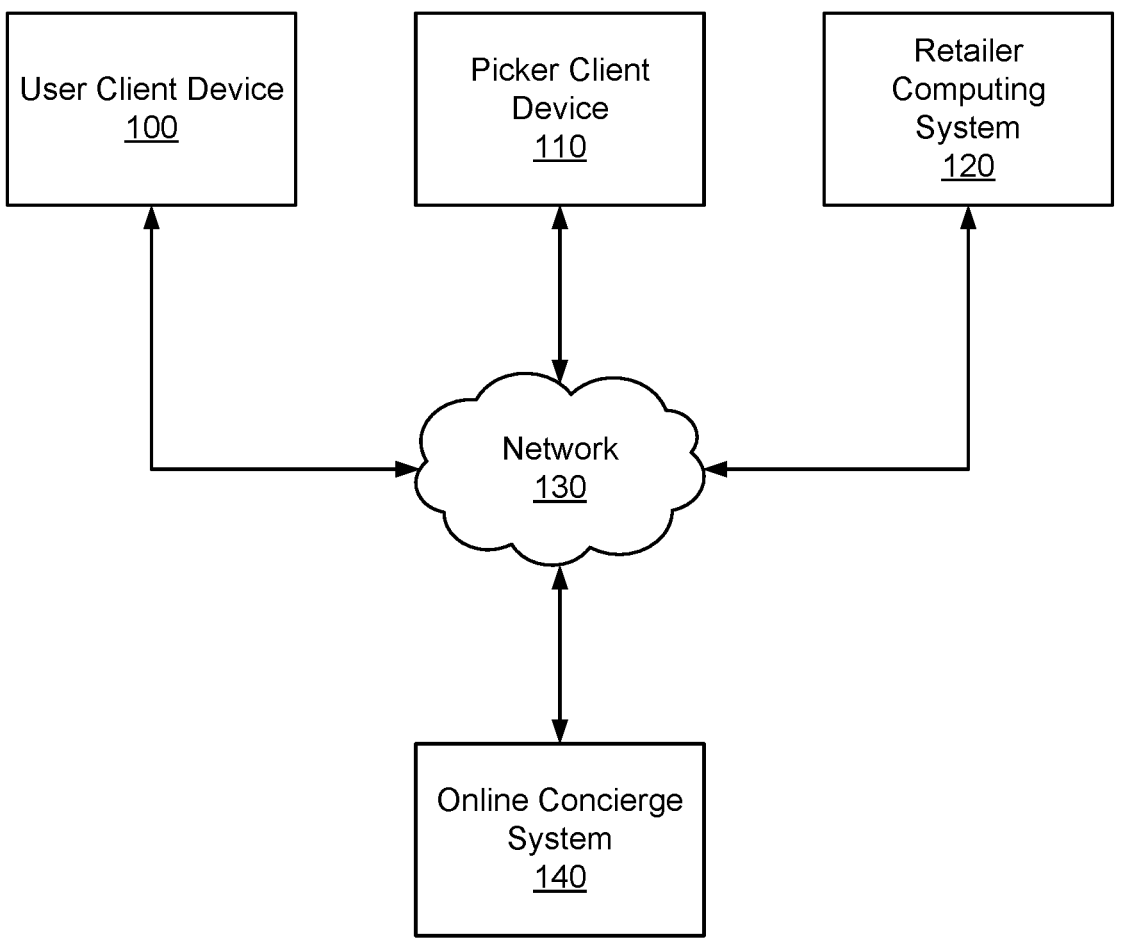
FIG. 1 illustrates an example system environment for an online concierge system, in accordance with one or more embodiments.

FIG. 1 illustrates an example system environment for an online concierge system 140, in accordance with one or more embodiments. The system environment illustrated in FIG. 1 includes a user client device 100, a picker client device 110, a retailer computing system 120, a network 130, and an online concierge system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

Although one user client device 100, picker client device 110, and retailer computing system 120 are illustrated in FIG. 1, any number of users, pickers, and retailers may interact with the online concierge system 140. As such, there may be more than one user client device 100, picker client device 110, or retailer computing system 120.

The user client device 100 is a client device through which a user may interact with the picker client device 110, the retailer computing system 120, or the online concierge system 140. The user client device 100 can be a personal or mobile computing device, such as a smartphone, a tablet, a laptop computer, or desktop computer. In some embodiments, the user client device 100 executes a client application that uses an application programming interface (API) to communicate with the online concierge system 140.

A user uses the user client device 100 to place an order with the online concierge system 140. An order specifies a set of items to be delivered to the user. An "item," as used herein, means a good or product that can be provided to the user through the online concierge system 140. The order may include item identifiers (e.g., a stock keeping unit (SKU) or a price look-up (PLU) code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The user client device 100 presents an ordering interface to the user. The ordering interface is a user interface that the user can use to place an order with the online concierge system 140. The ordering interface may be part of a client application operating on the user client device 100. The ordering interface allows the user to search for items that are available through the online concierge system 140 and the user can select which items to add to a "shopping list." A "shopping list," as used herein, is a tentative set of items that the user has selected for an order but that has not yet been finalized for an order. The ordering interface allows a user to update the shopping list, e.g., by changing the quantity of items, adding or removing items, or adding instructions for items that specify how the item should be collected.

The user client device 100 may receive additional content from the online concierge system 140 to present to a user. For example, the user client device 100 may receive coupons, recipes, or item suggestions. The user client device 100 may present the received additional content to the user as the user uses the user client device 100 to place an order (e.g., as part of the ordering interface).

Additionally, the user client device 100 includes a communication interface that allows the user to communicate with a picker that is servicing the user's order. This communication interface allows the user to input a text-based message to transmit to the picker client device 110 via the network 130. The picker client device 110 receives the message from the user client device 100 and presents the message to the picker. The picker client device 110 also includes a communication interface that allows the picker to communicate with the user. The picker client device 110 transmits a message provided by the picker to the user client device 100 via the network 130. In some embodiments, messages sent between the user client device 100 and the picker client device 110 are transmitted through the online concierge system 140. In addition to text messages, the communication interfaces of the user client device 100 and the picker client device 110 may allow the user and the picker to communicate through audio or video communications, such as a phone call, a voice-over-IP call, or a video call.

The picker client device 110 is a client device through which a picker may interact with the user client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the user's order to the picker in a collection interface. The collection interface is a user interface that provides information to the picker on which items to collect for a user's order and the quantities of the items. In some embodiments, the collection interface provides multiple orders from multiple users for the picker to service at the same time from the same retailer location. The collection interface further presents instructions that the user may have included related to the collection of items in the order. Additionally, the collection interface may present a location of each item at the retailer, and may even specify a sequence in which the picker should collect the items for improved efficiency in collecting items. In some embodiments, the picker client device 110 transmits to the online concierge system 140 or the user client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a user's order. For example, the picker client device 110 displays a delivery location from the order to the picker. The picker client device 110 also provides navigation instructions for the picker to travel from the retailer location to the delivery location. When a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the user client device 100 for display to the user, so that the user can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a user from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at a particular retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The user client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which users can order items to be provided to them by a picker from a retailer. The online concierge system 140 receives orders from the user client device 100 through the network 130. The online concierge system 140 selects a picker to service the user's order and transmits the order to the picker client device 110 associated with the picker. The picker collects the ordered items from a retailer location and delivers the ordered items to the user. The online concierge system 140 may charge a user for the order and provide portions of the payment from the user to the picker and the retailer.

As an example, the online concierge system 140 may allow a user to order groceries from a grocery store retailer. The user's order may specify which groceries they want delivered from the grocery store and the quantities of each of the groceries. The user client device 100 transmits the user's order to the online concierge system 140 and the online concierge system 140 selects a picker to travel to the grocery store retailer location to collect the groceries ordered by the user. Once the picker has collected the groceries ordered by the user, the picker delivers the groceries to a location transmitted to the picker client device 110 by the online concierge system 140.

The online concierge system 140 dispatches pickers to fulfill orders from users, and when items requested by the users are not found, the online concierge system 140 attempts to find suitable replacements. The information gained from how users accepted replacements may be utilized by the online concierge system 140 to train a model (e.g., machine-learning computer model) to determine not just whether a suggested replacement was acceptable to a specific user of the online concierge system 140, but whether the user might prefer or otherwise be moved from an originally ordered item to a replacement item. The trained model can then be used for ads or other recommendations where it is desirable to influence the user to convert on an item that is different from the originally requested item, such as to determine a cohort of users who are likely to switch conversion of items if sufficiently prompted.

In one or more embodiments, during the flow of ordering, the online concierge system 140 suggests a replacement item for a missing item and observes a user's behavior in relation to the suggested replacement item. Upon gathering information about the user' behavior (e.g., user's replacement actions), the online concierge system 140 may deploy the trained model to infer the user's preferences from the gathered information and generate insights for a retailer (or, more generally, an item provider). The insights communicated from the online concierge system 140 to the retailer may represent call-for-actions so that the retailer may perform appropriate market adjustment action(s). The online concierge system 140 is described in further detail below with regards to FIG. 2.

Figure 2:
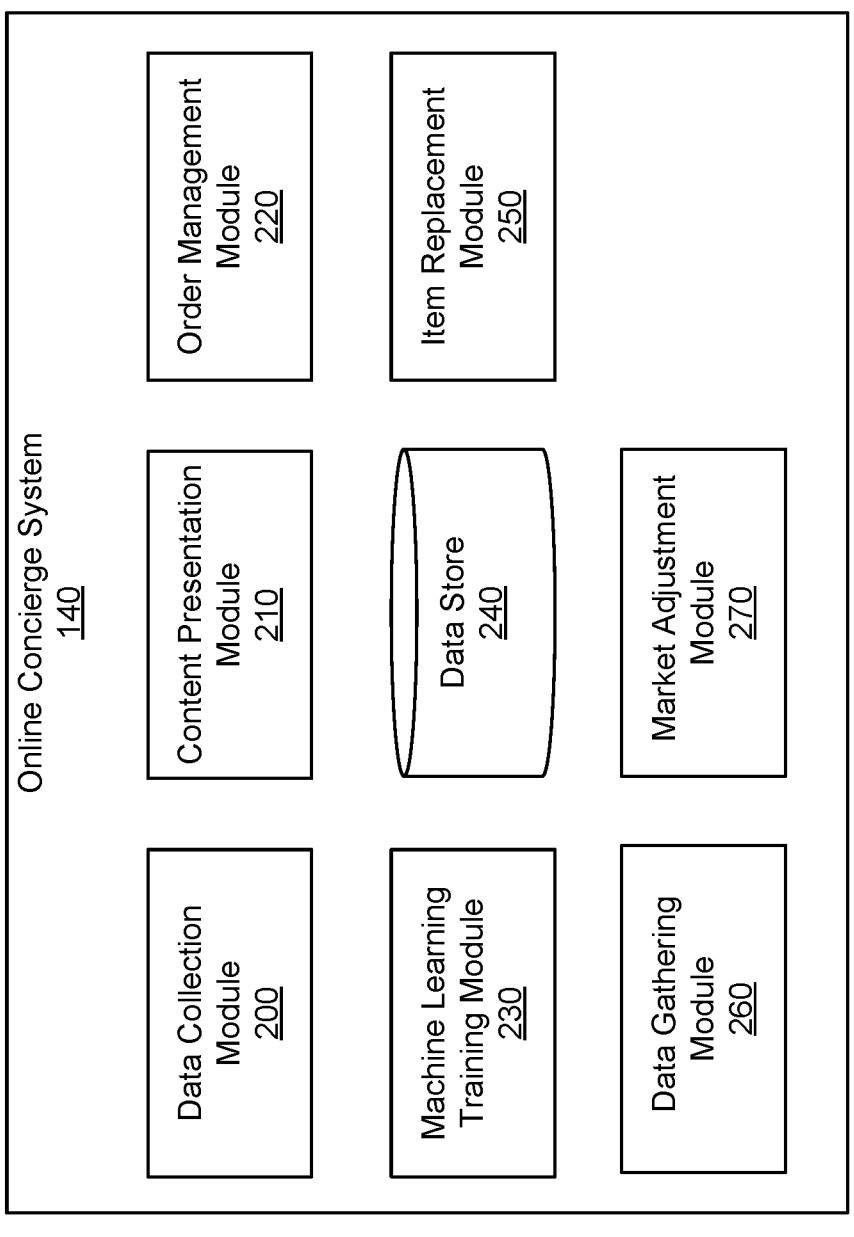
FIG. 2 illustrates an example system architecture for an online concierge system, in accordance with one or more embodiments.

FIG. 2 illustrates an example system architecture for the online concierge system 140, in accordance with some embodiments. The system architecture illustrated in FIG. 2 includes a data collection module 200, a content presentation module 210, an order management module 220, a machine-learning training module 230, a data store 240, an item replacement module 250, a data gathering module 260, and a market adjustment module 270. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects user data, which is information or data that describe characteristics of a user. For example, the data collection module 200 may collect the user data that include a user's name, address, shopping preferences, favorite items, or stored payment instruments. The data collection module 200 may collect the user data that also include default settings established by the user, such as a default retailer/retailer location, payment instrument, delivery location, or delivery timeframe. The data collection module 200 may collect the user data from sensors on the user client device 100 or based on the user's interactions with the online concierge system 140.

The data collection module 200 also collects item data, which is information or data that identifies and describes items that are available at a retailer location. The data collection module 200 may collect the item data that include item identifiers for items that are available and may include quantities of items associated with each item identifier. Additionally, the data collection module 200 may collect the item data that also include attributes of items such as the size, color, weight, stock keeping unit (SKU), or serial number for the item. The data collection module 200 may collect the item data that further include purchasing rules associated with each item, if they exist. For example, age-restricted items such as alcohol and tobacco are flagged accordingly in the item data. The data collection module 200 may collect the item data that also include information that is useful for predicting the availability of items in retailer locations. For example, the data collection module 200 may collect the item data that include, for each item-retailer combination (a particular item at a particular warehouse), a time that the item was last found, a time that the item was last not found (a picker looked for the item but could not find it), the rate at which the item is found, or the popularity of the item. The data collection module 200 may collect the item data from the retailer computing system 120, the picker client device 110, or the user client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the data collection module 200 may collect the picker data for a picker that include the picker's name, the picker's location, how often the picker has serviced orders for the online concierge system 140, a user rating for the picker, which retailers the picker has collected items at, or the picker's previous shopping history. Additionally, the data collection module 200 may collect the picker data that include preferences expressed by the picker, such as their preferred retailers to collect items at, how far they are willing to travel to deliver items to a user, how many items they are willing to collect at a time, timeframes within which the picker is willing to service orders, or payment information by which the picker is to be paid for servicing orders (e.g., a bank account). The data collection module 200 collects the picker data from sensors of the picker client device 110 or from the picker's interactions with the online concierge system 140.

Additionally, the data collection module 200 collects order data, which is information or data that describes characteristics of an order. For example, the data collection module 200 may collect the order data that include item data for items that are included in the order, a delivery location for the order, a user associated with the order, a retailer location from which the user wants the ordered items collected, or a timeframe within which the user wants the order delivered. Also, the data collection module 200 may collect the order data that further include information describing how the order was serviced, such as which picker serviced the order, when the order was delivered, or a rating that the user gave the delivery of the order. In some embodiments, the data collection module 200 collects the order data that include user data for users associated with the order, such as user data for a user who placed the order or picker data for a picker who serviced the order.

The content presentation module 210 selects content for presentation to a user. For example, the content presentation module 210 selects which items to present to a user while the user is placing an order. The content presentation module 210 generates and transmits an ordering interface for the user to order items. The content presentation module 210 populates the ordering interface with items that the user may select for adding to their order. In some embodiments, the content presentation module 210 presents a catalog of all items that are available to the user, which the user can browse to select items to order. The content presentation module 210 also may identify items that the user is most likely to order and present those items to the user. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a user. An item selection model is a machine-learning model that is trained to score items for a user based on item data for the items and user data for the user. For example, the item selection model may be trained to determine a likelihood that the user will order the item. In some embodiments, the item selection model uses item embeddings describing items and user embeddings describing users to score items. These item embeddings and user embeddings may be generated by separate machine-learning models and may be stored in the data store 240.

In some embodiments, the content presentation module 210 scores items based on a search query received from the user client device 100. A search query is free text for a word or set of words that indicate items of interest to the user. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a user (e.g., by comparing a search query embedding to an item embedding).

In some embodiments, the content presentation module 210 scores items based on a predicted availability of an item. The content presentation module 210 may use an availability model to predict the availability of an item. An availability model is a machine-learning model that is trained to predict the availability of an item at a particular retailer location. For example, the availability model may be trained to predict a likelihood that an item is available at a retailer location or may predict an estimated number of items that are available at a retailer location. The content presentation module 210 may apply a weight to the score for an item based on the predicted availability of the item. Alternatively, the content presentation module 210 may filter out items from presentation to a user based on whether the predicted availability of the item exceeds a threshold.

The order management module 220 manages orders for items from users. The order management module 220 receives orders from the user client device 100 and assigns the orders to pickers for service based on picker data. For example, the order management module 220 assigns an order to a picker based on the picker's location and the location of the retailer from which the ordered items are to be collected. The order management module 220 may also assign an order to a picker based on how many items are in the order, a vehicle operated by the picker, the delivery location, the picker's preferences on how far to travel to deliver an order, the picker's ratings by users, or how often a picker agrees to service an order.

In some embodiments, the order management module 220 determines when to assign an order to a picker based on a delivery timeframe requested by the user with the order. The order management module 220 computes an estimated amount of time that it would take for a picker to collect the items for an order and deliver the ordered items to the delivery location for the order. The order management module 220 assigns the order to a picker at a time such that, if the picker immediately services the order, the picker is likely to deliver the order at a time within the requested timeframe. Thus, when the order management module 220 receives an order, the order management module 220 may delay in assigning the order to a picker if the requested timeframe is far enough in the future (i.e., the picker may be assigned at a later time and is still predicted to meet the requested timeframe).

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the user client device 100 that describe which items have been collected for the user's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit, to the picker client device 110, instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the user with the location of the picker so that the user can track the progress of the order. In some embodiments, the order management module 220 computes an estimated time of arrival of the picker at the delivery location and provides the estimated time of arrival to the user.

In some embodiments, the order management module 220 facilitates communication between the user client device 100 and the picker client device 110. As noted above, a user may use the user client device 100 to send a message to the picker client device 110. The order management module 220 receives the message from the user client device 100 and transmits the message to the picker client device 110 for presentation to the picker. The picker may use the picker client device 110 to send a message to the user client device 100 in a similar manner.

The order management module 220 coordinates payment by the user for the order. The order management module 220 uses payment information provided by the user (e.g., a credit card number or a bank account) to receive payment for the order. In some embodiments, the order management module 220 stores the payment information for use in subsequent orders by the user. The order management module 220 computes a total cost for the order and charges the user that cost. The order management module 220 may provide a portion of the total cost to the picker for servicing the order, and another portion of the total cost to the retailer.

The machine-learning training module 230 trains machine-learning models used by the online concierge system 140. The online concierge system 140 may use machine-learning models to perform functionalities described herein. Example machine-learning models include regression models, support vector machines, naïve bayes, decision trees, k nearest neighbors, random forest, boosting algorithms, k-means, and hierarchical clustering. The machine-learning models may also include neural networks, such as perceptrons, multilayer perceptrons, convolutional neural networks, recurrent neural networks, sequence-to-sequence models, generative adversarial networks, or transformers. A machine-learning model may include components relating to these different general categories of model, which may be sequenced, layered, or otherwise combined in various configurations. While the term "machine-learning model" may be broadly used herein to refer to any kind of machine-learning model, the term is generally limited to those types of models that are suitable for performing the described functionality. For example, certain types of machine-learning models can perform a particular functionality based on the intended inputs to, and outputs from, the model, the capabilities of the system on which the machine-learning model will operate, or the type and availability of training data for the model.

Each machine-learning model includes a set of parameters. The set of parameters for a machine-learning model are parameters that the machine-learning model uses to process an input to generate an output. For example, a set of parameters for a linear regression model may include weights that are applied to each input variable in the linear combination that comprises the linear regression model. Similarly, the set of parameters for a neural network may include weights and biases that are applied at each neuron in the neural network. The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model based on a set of training examples. Each training example includes input data to which the machine-learning model is applied to generate an output. For example, each training example may include user data, picker data, item data, or order data. In some cases, the training examples also include a label which represents an expected output of the machine-learning model. In these cases, the machine-learning model is trained by comparing its output from input data of a training example to the label for the training example. In general, during training with labeled data, the set of parameters of the model may be set or adjusted to reduce a difference between the output for the training example (given the current parameters of the model) and the label for the training example.

The machine-learning training module 230 may apply an iterative process to train a machine-learning model whereby the machine-learning training module 230 updates parameter values of the machine-learning model based on each of the set of training examples. The training examples may be processed together, individually, or in batches. To train a machine-learning model based on a training example, the machine-learning training module 230 applies the machine-learning model to the input data in the training example to generate an output based on a current set of parameter values. The machine-learning training module 230 scores the output from the machine-learning model using a loss function. A loss function is a function that generates a score for the output of the machine-learning model such that the score is higher when the machine-learning model performs poorly and lower when the machine-learning model performs well. In cases where the training example includes a label, the loss function is also based on the label for the training example. Some example loss functions include the mean square error function, the mean absolute error, hinge loss function, and the cross entropy loss function. The machine-learning training module 230 updates the set of parameters for the machine-learning model based on the score generated by the loss function. For example, the machine-learning training module 230 may apply gradient descent to update the set of parameters.

In one or more embodiments, the machine-learning training module 230 may re-train the machine-learning model based on the actual performance of the model after the online concierge system 140 has deployed the model to provide service to users. For example, if the machine-learning model is used to predict a likelihood of an outcome of an event, the online concierge system 140 may log the prediction and an observation of the actual outcome of the event. Alternatively, if the machine-learning model is used to classify an object, the online concierge system 140 may log the classification as well as a label indicating a correct classification of the object (e.g., following a human labeler or other inferred indication of the correct classification). After sufficient additional training data has been acquired, the machine-learning training module 230 re-trains the machine-learning model using the additional training data, using any of the methods described above. This deployment and re-training process may be repeated over the lifetime use for the machine-learning model. This way, the machine-learning model continues to improve its output and adapts to changes in the system environment, thereby improving the functionality of the online concierge system 140 as a whole in its performance of the tasks described herein.

The data store 240 stores data used by the online concierge system 140. For example, the data store 240 stores user data, item data, order data, and picker data for use by the online concierge system 140. The data store 240 also stores trained machine-learning models trained by the machine-learning training module 230. For example, the data store 240 may store the set of parameters for a trained machine-learning model on one or more non-transitory, computer-readable media. The data store 240 uses computer-readable media to store data, and may use databases to organize the stored data.

During an ordering session, a user of the online concierge system 140 may request (e.g., via a user interface of the user client device 100) a specific item that is not available at one or more stores of a retailer associated with the online concierge system 140. Upon determination (e.g., by the order management module 220) that the requested item is unavailable, the item replacement module 250 may suggest one or more replacement items for replacing the missing item. The item replacement module 250 may access an item replacement computer model (e.g., machine-learning computer model) that is trained to generate a replacement score for each candidate replacement item in a set of candidate replacement items (e.g., as retrieved from the data store 240 based a type of the missing item). The item replacement module 250 may deploy the item replacement computer model to run a machine-learning algorithm to generate, based on user data associated with the user and one or more features for each candidate replacement item in the set of candidate replacement items, the replacement score for each candidate replacement item. A set of parameters for the item replacement computer model may be stored at one or more non-transitory computer-readable media of the item replacement module 250. Alternatively, the set of parameters for the item replacement computer model may be stored at one or more non-transitory computer-readable media of the data store 240.

The item replacement module 250 may select, based on the replacement score for each candidate replacement item, a replacement item from the set of candidate replacement items. The content presentation module 210 may then cause a user interface of the user client device 100 to display the replacement item for recommendation to the user and inclusion into a shopping cart. The user may utilize the user interface of the user client device 100 to include the recommended replacement item to the cart. Alternatively, the user may only view details of the replacement item (e.g., click on the replacement item) but choose not to include the replacement item into the shopping cart. Alternatively, the user may only view the displayed replacement item but choose not to include the replacement item into the cart even without viewing any additional details about the replacement item.

When the user places an order with the online concierge system 140, a typical session flow is as follows. The user may search for a specific item and add an item to a shopping cart from within the returned result set. After starting the checkout process, the user may be prompted (e.g., via the content presentation module 210) to select alternative replacement items (e.g., as determined by the item replacement module 250) to replace one or more missing items. If an item requested by the user cannot be found, the user may also communicate with a picker fulfilling the user's order about possible replacements for the missing item. Sometimes, the communication between the user and the picker fails to happen, and the user is exposed to an alternative item without their interaction with the picker. After delivery, the user may be prompted (e.g., via the content presentation module 210) to rate the replacement item selections and/or to provide a comment.

The data gathering module 260 may gather data related to observed user's behavior in relation to the replacement item displayed at the user interface of the user client device 100. The data collected by the data gathering module 260 may be provided as input data to a computer model deployed by the market adjustment module 270. The data gathering module 260 may gather the data from various sources. In one or more embodiments, the data gathering module 260 collects information about an engagement of the user in relation to the replacement item, such as information about whether the user selected the replacement item for inclusion into the shopping cart. Alternatively or additionally, the data gathering module 260 may collect contextual information associated with the user, such as user's demographic data (e.g., gender identity, age, socioeconomic strata, etc.), information about a time period when the request for the missing item is placed by the user (e.g., exact timestamp, seasonal information, information about proximity to other events or holidays, etc.), information about other items in the user's cart, information about the current user's session (e.g., information about search/browsing actions performed by the user during the current session), information about additional replacements made by the user within the same order in effect of the current item replacement (e.g., pesto crackers are out-of-stock and they are replaced with plain crackers and pesto dressing), etc.

Within the user's session flow, there is a number of time instants when the user expresses preferences about recommended replacement items that may be gathered by the data gathering module 260. For example, the data gathering module 260 may collect data related to a chat between the user and a picker fulfilling the current order about the recommended replacement item. Alternatively or additionally, the data gathering module 260 may collect information about an appeasement request from the user, wherein the appeasement request is sent by user (e.g., via the user interface of the user client device 100) in response to displaying the replacement item at the user interface of the user client device 100. Alternatively or additionally, the data gathering module 260 may collect information about a review submitted by the user in relation to the recommended replacement item, which represents an explicit user's opinion about the recommended replacement item.

One example user's behavioral information that the data gathering module 260 may collect is related to the case when there is no solid match for a missing item and the user chooses a different type of item. For example, the user searches for a specific brand (e.g., "diet coke") and then chooses a different type of item ultimately (e.g., "classic pepsi") despite certain item(s) of their originally intended brand being available. When selecting replacement items during the checkout, the user may express their immediate preference based on their own prior knowledge, which may represent valuable information collected by the data gathering module 260. In contrast, when the picker selects replacement items, this is done based on their knowledge of common preferences or alternatives, which may also represent valuable information collected by the data gathering module 260. When the user rates replacement items after obtaining an order receipt, this user's rating may be based on the difference between their original desires and what they ultimately received and may be also collected by the data gathering module 260. Furthermore, replacement discussions between the picker and the user may be gathered by the data gathering module 260 for item names, item characteristics, and/or information about replacement sentiment. The data gathering module 260 may also gather information about changes in user's behavior such as future reordering of items that were offered only as replacement items, which can be used as confirmation of successful positioning of an alternative item and that the alternative item was ultimately preferred by the user.

Each of the aforementioned is a way for the user to inform the online concierge system 140 about what they prefer versus what they do not prefer in relation to a recommended replacement item, effectively providing user's inputs that are stronger than the traditional market research. This is because the user is not only expressing their preferences that are directly harvestable, but also because the user expresses the preferences by spending or preserving money (i.e., converting a recommended replacement item or choosing not to convert the recommended replacement item). In contrast, a market research focus group typically represents a setting where there is no real monetary cost to the user. Therefore, the data collected by the data gathering module 260 can effectively create market research for retailer's items, informing the retailer of what their item is competing with, for what audiences and in what contexts.

The market adjustment module 270 may generate, based on data collected by the data gathering module 260 (e.g., replacement actions performed by the user), market adjustment recommendations (e.g., market insight messages) for a retailer associated with the online concierge system 140. The market adjustment recommendations provided to the retailer (e.g., to the retailer computing system 120) may prompt the retailer to perform one or more appropriate adjustment actions in relation to a market that the retailer covers and can influence with their actions. The market adjustment module 270 may access a market adjustment computer model (e.g., machine-learning computer model) that is trained to generate a score for the user indicative of an affinity of the user in relation to the replacement item, as well as one or more market adjustment recommendations for the retailer. The market adjustment module 270 may deploy the market adjustment computer model to run a machine-learning algorithm to generate, based on the data collected by the data gathering module 260, the one or more market adjustment recommendations for the retailer and the score for the user. The market adjustment module 270 may further provide, via the network 130, the one or more market adjustment recommendations to the retailer computing system 120 prompting the retailer to perform one or more actions in order to adjust a market. A set of parameters for the market adjustment computer model may be stored at one or more non-transitory computer-readable media of the market adjustment module 270. Alternatively, the set of parameters for the market adjustment computer model may be stored at one or more non-transitory computer-readable media of the data store 240.

In one or more embodiments, the market adjustment computer model is a natural language processing (NLP) model that is trained to generate the one or more market adjustment recommendations for the retailer by extracting market-related insights from a chat discussion between the user and the picker about one or more replacement items. Alternatively, the market adjustment computer model may be a LLM that is trained to generate the one or more market adjustment recommendations for the retailer responsive to a prompt that includes a chat discussion between the user and the picker about one or more replacement items. In one or more other embodiments, the score for the user that is indicative of the user's affinity in relation to the replacement item may be utilized (along with scores for other users, as well as historical replacement data for each user) by the market adjustment computer model for re-targeting users by defining a group of users (e.g., audience) that will likely choose a certain set of items if offered (e.g., organic food) and/or are suitable for ads in relation to replacement items. The market adjustment computer model may determine whether the user can be in the retargeting group depending on whether their prior purchase was a replacement item, and if it was the replacement item, whether they continued to purchase the replacement item. If the user purchased the replacement item, the market adjustment computer model may recommend that the retailer adds an incentive (e.g., coupon) for this specific replacement item.

The market adjustment computer model may be trained (e.g., via the machine-learning training module 230) to predict not only whether the replacement item was merely acceptable, but whether the replacement item is just as good as a missing item or even preferred to the missing item. The market adjustment computer model may then use this prediction to generate various recommendations for the retailer, such as recommendations for stock adjustment in relation to the replacement item and/or the missing item, recommendations for generating ads (e.g., flyers) in relation to the replacement item, recommendation to providing incentives (e.g., coupons) for conversion of the replacement item, recommendations for generating new item lines related to the replacement item, etc. Additionally or alternatively, the market adjustment computer model may determine, based on the prediction and the user's score, whether the user can be converted from one item (e.g., originally requested missing item) to another item (e.g., replacement item). In general, the market adjustment computer model may compare replacement data gathered by the data gathering module 260 with data associated with the requested missing item and make suggestions for alterations for the retailer to consider with their replacement item in comparison to the missing item.

In one or more embodiments, when the user declines conversion of a recommended replacement item, the market adjustment computer model predicts a reason why the user declined the conversion. For example, the market adjustment computer model may predict that the reason for the declined conversion is a price difference between the replacement item and a missing item. Alternatively or additionally, the market adjustment computer model may predict that the reason for the declined conversion is a short supply of the replacement item. Alternatively or additionally, the market adjustment computer model may predict that the reason for the declined conversion is a nutritional value change that differed from the originally requested missing item (i.e., user's preference). Each of these reasons may be communicated, via the network 130, as corresponding digital signals from the market adjustment module 270 to the retailer computing system 120 in order to prompt the retailer to perform one or more corrective actions in relation to the replacement item.

When the market adjustment computer model predicts that a needed corrective action in relation to the replacement item is a pricing adjustment, the market adjustment computer model may also propose to the retailer a price adjustment for the replacement item. Additionally, the market adjustment computer model may also recommend to the retailer offering a one-time coupon to incentivize conversion of the replacement item. The market adjustment computer model may further generate a one-time use coupon catered to individual user's preferences, encouraging them to convert the replacement item. The market adjustment module 270 may communicate, via the network 130, digital signals that include information about the price adjustment and/or coupon to the retailer computing system 120.

In one or more embodiments, when the user converts a recommended replacement item, the market adjustment computer model determines similarities between the recommended replacement item and an originally requested missing item in order to determine what feature(s) of the replacement item caused the user's conversion of the replacement item. The market adjustment module 270 may communicate, via the network 130, this information to the retailer computing system 120 to encourage branding and advertising associations of items which may have overlapping features. Additionally or alternatively, the market adjustment computer model may suggest replacement of one or more items which have been already found during the current ordering session so that the replacement item is further advertised with associated items from the retailer. For example, when the user replaces Brand A chips with Brand B chips, the market adjustment computer model may suggest an add-on for replacing sour cream with Brand B dips for "maximum enjoyment" of the replacement item (i.e., Brand B chips). The market adjustment computer model may also recommend offering the add-on at a discounted price. The market adjustment module 270 may communicate, via the network 130, digital signals with information about the add-on to the retailer computing system 120.

In one or more embodiments, when the user converts a recommended replacement item and the market adjustment module 270 determines that the replacement item is frequently purchased with an associated item, the market adjustment computer model may generate an analysis of the replacement item and the associated item. The market adjustment module 270 may communicate, via the network 130, digital signals with information about the analysis of multiple items, to the retailer computing system 120 so that the retailer may consider having one or more new items in stock. For example, if hummus is frequently purchased with hot sauce, the market adjustment computer model may generate a recommendation for the retailer to consider having a spicy hummus item to fulfill market needs.

In one or more embodiments, the market adjustment computer model can contribute in promotional endeavors. In particular, the market adjustment computer model may automatically generate, based on the replacement data collected by the data gathering module 260 and/or insights detected by the market adjustment computer model, highly-tailored segments in digital flyers to highlight specific items. For example, the market adjustment computer model may identify a frequently substituted item "xyz". The market adjustment computer model may then auto-generate a graphic box or segment in a digital flyer, showcasing the item "xyz" with potentially attractive headlines, detail points, or suggested item combinations, all driven by the discovered insights. In this manner, users of the online concierge system 140 may be made aware of the item "xyz" and its positive aspects, thereby potentially boosting its sales while improving the efficacy of promotional flyers. Alternatively, the market adjustment computer model may feed detected insights into an LLM, which may then automatically generate the text and/or graphics of a digital flyer. The market adjustment module 270 may then import the generated digital flyer from the LLM and communicate, via the network 130, information about the digital flyer to the retailer computing system 120.

In one or more embodiments, an insight about frequently substituted items detected by the market adjustment computer model may necessitate the production of more units of an item or increased stocking of the item in stores. If the market adjustment computer model indicates a frequent substitution event for a specific item, the market adjustment computer model may generate a corresponding message as a call-to-action concerning grocery stores of a retailer and/or manufacturers of this specific item. For example, if users are often substituting "Brand A BBQ Sauce" with "Brand B BBQ Sauce", the market adjustment computer model may generate a signal for the retailer (e.g., for the retailer computing system 120) indicating a need for inventory review. In response to the signal received at the retailer computing system 120, the retailer may review "Brand A BBQ Sauce" stock levels and consider whether to increase or decrease quantities based on observed users' behaviors. On the other hand, responsive to the signal received at the retailer computing system 120, a manufacturer of the "Brand B BBQ Sauce" may increase production to meet this higher demand. This may lead to a more efficient stock adjustment aligning with users' preference trends and effectively eliminating or, at least, reducing stock-out scenarios.

In one or more embodiments, the market adjustment computer model generates real-time messages for various partners (e.g., retailers, pickers, individual grocery stores, etc.). In this manner, the market adjustment computer model may promptly inform the partners about ongoing developments and potential actionable tasks. For example, if the market adjustment computer model identifies a sudden trend of an item being frequently substituted, a real-time alert can be generated by the market adjustment computer model and communicated (e.g., by the market adjustment module 270) to all relevant partners (e.g., retailers, managers of grocery stores, etc.). In this manner, the relevant partners can consider immediate actions if required, such as increasing advertising or making pricing adjustments in relation to the frequently substituted item. Similarly, the managers of grocery stores can promptly react by changing shelf layout, managing stock levels, and/or planning promotions in relation to the frequently substituted item. This direct and quick information dispatch by the market adjustment computer model and the online concierge system 140 as a whole may result in a more agile response to ongoing market trends.

In one or more embodiments, the market adjustment computer model infers, based on replacement data from a collection of users of the online concierge system 140 (e.g., as gathered by the data gathering module 260), an insight about preferences of different demographics of users to various items for replacing a missing item. For example, users that belong to different demographics order a particular diet cola item, but due to a supply shortage in a specific city, the diet cola item is frequently replaced with a range of items such as alternate cola brands, soda flavors, or non-diet variants of the original item. Based on the replacement data gathered over the course of the shortage (e.g., by the data gathering module 260), the market adjustment computer model may generate a report for a retailer and/or goods manufacturer. The generated report may include the following demographic analysis: lower income demographics preferred a competing brand of close enough flavor and price; higher income households switched to a competing brand of higher price but similar flavor; households with younger children often preferred no replacement, as chat between pickers and users indicated that no other brand would be acceptable to their children; a large chunk of households were willing to pivot to flavored variants, such as a vanilla flavored version of the diet cola item, as a second choice; a handful of households were (based on their order history) newly exposed to the vanilla flavored variant and enjoyed it greatly, suggesting that sales could be bolstered by increasing awareness of the vanilla flavored soda within that region. The market adjustment module 270 (or some other module of the online concierge system 140) may communicate, via the network 130, the generated report to the retailer computing system 120. The retailer and/or the goods manufacturer may then analyze the report and perform one or more actions to appropriately address the supply shortage of the diet cola item.

In one or more embodiments, the market adjustment computer model infers, based on replacement data from a collection of users of the online concierge system 140 (e.g., as gathered by the data gathering module 260), insights about reasons why the users decide to stick to a particular missing item or to a specific attribute of the missing item although different replacement items have been offered. The inferred insights may be communicated in the form of a digital report from the market adjustment module 270 (or some other module of the online concierge system 140), via the network 130, to the retailer computing system 120. A retailer associated with the retailer computing system 120 may then analyze the report and perform one or more actions to appropriately address this particular stickiness-to-item issue. For example, if a large section of users who are offered to replace a specific item choose a refund instead (e.g., compared to other items within a retailer's portfolio), this provides the retailer with the insight that they may have an item with a moat (to some degree) and they do not have to innovate on the item as much. In another example, if a specific portion of users of the online concierge system 140 never replaces a sugar free cola with a non-sugar-free drink or the trendline of those users that do replace is decreasing, the retailer can realize that the sugar free feature is important to particular users and population at large.

In one or more embodiments, the market adjustment computer model infers, based on replacement data from a collection of users of the online concierge system 140 (e.g., as gathered by the data gathering module 260), insights about flavor profiles for the collection of users. Information about the flavor and varietal of an item that the user chooses to replace with may be utilized by the market adjustment computer model to infer valuable information about the user. For example, users who are weight sensitive may only replace certain cans of soup with other certain cans of soup based on calorie count, and the market adjustment computer model may infer this particular insight over time. User flavor profiles can be drawn about "taste preference" profiles if there is a select grouping of varietals within items that certain segments of users swap between, e.g., grouping of fruity ice cream flavors, grouping of salad dressings, etc. Based on the insight about grouping of varietals within items (e.g., as inferred by the market adjustment computer model), the retailer can create new flavor combinations that represent a mix of multiple flavors. The inferred insights about flavor profiles of the users may be communicated in the form of a digital report from the market adjustment module 270 (or some other module of the online concierge system 140), via the network 130, to the retailer computing system 120. A retailer associated with the retailer computing system 120 may then analyze the report and perform one or more actions to appropriately address flavor preferences of the users.

The content presentation module 210 may cause the user client device 100 to display (e.g., before the checkout or at the checkout) a user interface with a recommended replacement item (e.g., as selected by the item replacement module 250). The user may then choose to add the recommended item to a shopping cart. Alternatively, the user may choose not to include the recommended item to the shopping cart. Furthermore, the content presentation module 210 may communicate, via the network 130, a market adjustment recommendation to the retailer computing system 120 (e.g., in relation to the recommended item) prompting the retailer to perform an appropriate market adjustment action in relation to the recommended replacement item.

The machine-learning training module 230 may perform initial training of the market adjustment computer model using data collected (e.g., via the data gathering module 260) from item replacement flows associated with a collection of users of the online concierge system 140. The collected data may include behavioral information for the collection of users in relation to a suggested set of replacement items (e.g., information about features of converted replacement items relative to features of originally requested missing items, discussions between users and pickers during the replacement process, explicit comments from users in relation to the suggested replacement items, information about future reordering of replacement items, appeasement requests from the users, etc.), as well as contextual information for the collection of users (e.g., demographic information about the collection of users, a time of day/week/year when conversion of suggested replacement items is the highest/lowest, etc.).

The machine-learning training module 230 may collect feedback data with information about the user's response to the recommended item (e.g., conversion data) displayed at the user interface of the user client device 100. The machine-learning training module 230 may use the collected feedback data to re-train the item replacement computer model (e.g., to update the set of parameters of the item replacement computer model). The machine-learning training module 230 may further collect retailer action data with information about a market adjustment action conducted by the retailer in response to the market adjustment recommendation generated by the market adjustment computer model. The machine-learning training module 230 may use the collected retailer action data to re-train the market adjustment computer model (e.g., to update the set of parameters of the market adjustment computer model computer model).

Figure 3:
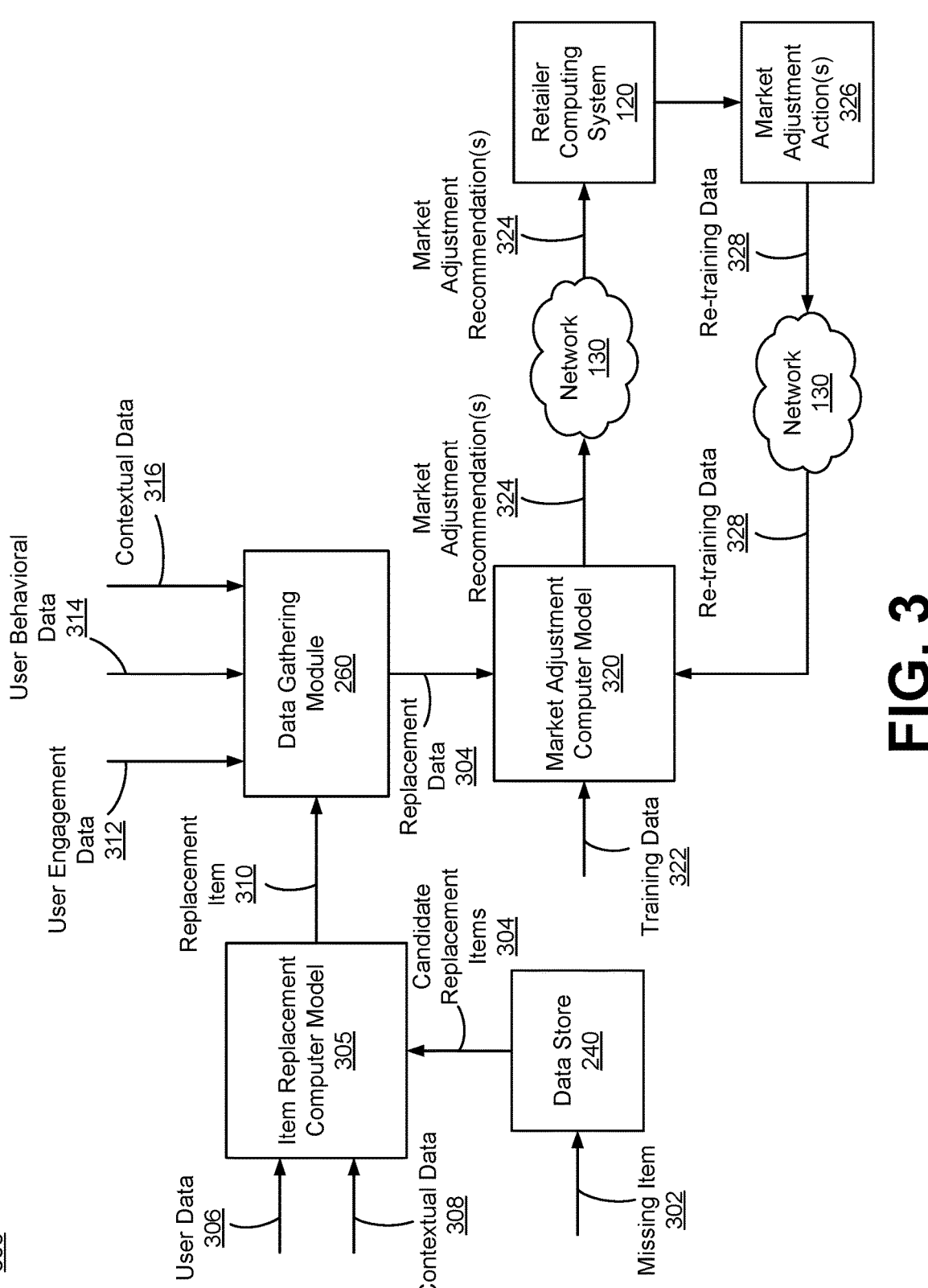
FIG. 3 illustrates an example architectural flow diagram of using a trained computer model to generate market adjustment recommendations for a retailer associated with an online concierge system, in accordance with one or more embodiments.

FIG. 3 illustrates an example architectural flow diagram 300 of using a trained computer model to generate market adjustment recommendations for a retailer associated with the online concierge system 140, in accordance with one or more embodiments. Upon a user of the online concierge system 140 requests, during an ordering session, an item that is not available at one or more grocery stores of the retailer, information about a missing item 302 may be passed to the data store 240 that stores a repository of items. Based upon one or more features of the missing item 302, the data store 240 may import a set of candidate replacement items 304 to an item replacement computer model 305. Other inputs of the item replacement computer model 305 may be user data 306 (e.g., information about user's purchasing history as available at the data store 240) and/or contextual data 308 (e.g., information about content of a user's shopping cart, demographics information about the user, etc.). Based on the inputs provided to the item replacement computer model 305, the item replacement computer model 305 may generate a replacement score for each candidate replacement item in the set of candidate replacement items 304. Using the replacement score for each candidate replacement item, the item replacement computer model 305 (or the item replacement module 250 that deploys the item replacement computer model 305) may select a replacement item 310. The replacement item 310 may be displayed at the user interface of the user client device 100 (not shown in FIG. 3) so that the user may include the replacement item 310 into the shopping cart.

As aforementioned, the data gathering module 260 may collect data from various sources. For example, the data gathering module 260 may gather user engagement data 312 with information about whether the user selected the replacement item 310 for inclusion into the shopping cart. The data gathering module 260 may further gather user behavioral data 314 related to observed user's behavior in relation to the replacement item 310. Alternatively or additionally, the data gathering module 260 may gather contextual data 316 with information about user's demographic (e.g., gender identity, age, socioeconomic strata, etc.), information about a time period when the request for the missing item 302 is placed by the user (e.g., exact timestamp, seasonal information, information about proximity to other events or holidays, etc.), information about other items in the user's shopping cart, information about the current user's ordering session (e.g., information about search/browsing actions performed by the user during the current ordering session), information about additional replacements made by the user during the current ordering session, etc. All data collected by the data gathering module 260 may be provided as replacement data 318 to a market adjustment computer model 320.

The market adjustment computer model 320 may be trained (e.g., via the machine-learning training module 230, before the current ordering session of the user) using training data 322 to generate market adjustment recommendation(s) 324 for the retailer, and optionally, to generate a score for the user indicative of an affinity of the user in relation to the replacement item 310. The training data 322 may include behavioral information for a collection of users of the online concierge system 140 in relation to a set of replacement items (e.g., information about features of converted replacement items relative to features of originally requested missing items, discussions between users and pickers during the replacement process, explicit comments from users in relation to the set of replacement items, information about future reordering of replacement items, appeasement requests from the users, etc.), and/or contextual information for the collection of users (e.g., demographic information about the collection of users, a time of day/week/year when conversion of suggested replacement items is the highest/lowest, etc.). The trained market adjustment computer model 320 may be deployed by the market adjustment module 270 to generate, based on the set of candidate replacement items 304, the market adjustment recommendation(s) 324 for the retailer.

The market adjustment module 270 (or some other module of the online concierge system 140) may send, via the network, a digital report that includes the market adjustment recommendation(s) 324 to the retailer computing system 120. As aforementioned, the market adjustment recommendation(s) 324 for the retailer may include a recommendation for a price adjustment in relation to the missing item 302 and/or the replacement item 310, a recommendation about a stocking adjustment in relation to the missing item 302 and/or the replacement item 310, a recommendation about adjustment of one or more features (e.g., flavor) of the missing item 302 and/or the replacement item 310, a recommendation for a purchase incentive (e.g., one-time coupon), some other market adjustment recommendation, or some combination thereof. Upon receiving the digital report with the market adjustment recommendation(s) 324 at the retailer computing system 120, the retailer may perform market adjustment action(s) 326. Information about the market adjustment action(s) 326 may be communicated, via the network 130, to the market adjustment computer model 320 as re-training data 328. The re-training data 328 may be utilized by the machine-learning training model to update a set of parameters of the market adjustment computer model 320 (i.e., to re-train the market adjustment computer model 320).

FIG. 4 is a flowchart for a method of using a trained computer model to generate market adjustment recommendations for a retailer associated with an online concierge system, in accordance with one or more embodiments. Alternative embodiments may include more, fewer, or different steps from those illustrated in FIG. 4, and the steps may be performed in a different order from that illustrated in FIG. 4. These steps may be performed by an online concierge system (e.g., the online concierge system 140). Additionally, each of these steps may be performed automatically by the online concierge system without human intervention.

The online concierge system 140 receives 405 (e.g., via the order management module 220) a request from a user of the online concierge system for an item. Responsive to the request, the online concierge system 140 identifies 410 (e.g., via the order management module 220) that the requested item is unavailable at a retailer associated with the online concierge system 140. Upon the identification that the requested item is unavailable, the online concierge system 140 accesses 415 an item replacement computer model of the online concierge system 140 (e.g., via the item replacement module 250), wherein the item replacement computer model is trained to generate a replacement score for each candidate replacement item in a set of candidate replacement items. The online concierge system 140 applies 420 the item replacement computer model (e.g., via the item replacement module 250) to generate, based at least in part on user data associated with the user and one or more features for each candidate replacement item in the set of candidate replacement items, the replacement score for each candidate replacement item. The online concierge system 140 selects 425 (e.g., via the item replacement module 250), based on the replacement score for each candidate replacement item, a replacement item from the set of candidate replacement items. The online concierge system 140 causes 430 (e.g., via the content presentation module 210) a user interface of a device associated with the user (e.g., the user client device 100) to display the replacement item for recommendation to the user and inclusion into a cart.

The online concierge system 140 collects 435 (e.g., via the data gathering module 260) engagement data with information about an engagement of the user in relation to the replacement item. The online concierge system 140 may generate (or gather) (e.g., via the data gathering module 260) the behavioral information of the user. The gathered behavioral information may include at least one of: information about a brand of the replacement item converted by the user relative to a brand of the requested item, information about a type of the replacement item converted by the user relative to a type of the requested item, a discussion between the user and a picker associated with the online system during a fulfillment process associated with the replacement item, information about a future reordering of the replacement item by the user, or an appeasement request from the user associated with the requested item. The online concierge system 140 may further generate (or gather) (e.g., via the data gathering module 260) the contextual information associated with the user. The gathered contextual information may include at least one of: demographic information about the user, a timestamp when the request for the item was made, content of the cart, or information about one or more other replacement items included in the cart.

The online concierge system 140 accesses 440 a market adjustment computer model of the online concierge system 140 (e.g., via the market adjustment module 270), wherein the market adjustment computer model is trained to generate a score for the user indicative of an affinity of the user in relation to the replacement item and one or more market adjustment recommendations for the retailer. The online concierge system 140 applies 445 (e.g., via the market adjustment module 270) the market adjustment computer model to generate, based on at least one of the engagement data, behavioral information of the user or contextual information associated with the user, the score for the user and the one or more market adjustment recommendations for the retailer.

In one or more embodiments, the online concierge system 140 clusters (e.g., via the market adjustment module 270), based at least in part on the generated score for the user, the user into a cluster of users of the online concierge system 140, wherein each user in the cluster is associated with a likelihood of switching from a conversion of the item to a conversion of the replacement item greater than a threshold value. The online concierge system 140 may store (e.g., via the market adjustment module 270 or some other module of the online concierge system 140), in a database of the online concierge system 140 (e.g., at the data store 240), information about the cluster of users.

In one or more embodiments, the online concierge system 140 may apply the market adjustment computer model (e.g., via the market adjustment module 270) to generate, based on at least one of the engagement data, the behavioral information of the user or the contextual information associated with the user, the one or more market adjustment recommendations including information about one or more reasons for the user declining to convert the recommended replacement item. In one or more other embodiments, the online concierge system 140 may apply the market adjustment computer model (e.g., via the market adjustment module 270) to generate, based on at least one of the engagement data, the behavioral information of the user or the contextual information associated with the user, the one or more market adjustment recommendations including at least one of a first recommendation about an adjustment of a price of the replacement item or a second recommendation for generating a coupon for incentivizing a conversion of the replacement item.

In one or more other embodiments, the online concierge system 140 may apply the market adjustment computer model (e.g., via the market adjustment module 270) to generate, based on at least one of the engagement data, the behavioral information of the user or the contextual information associated with the user, the one or more market adjustment recommendations including a recommendation for at least one of branding or advertising a group of items including the replacement item which was converted by the user. In one or more other embodiments, the online concierge system 140 may apply the market adjustment computer model (e.g., via the market adjustment module 270) to generate, based on at least one of the engagement data, the behavioral information of the user or the contextual information associated with the user, the one or more market adjustment recommendations including a recommendation for the retailer to combine the replacement item with one or more other items into a single item.

In one or more other embodiments, the online concierge system 140 may apply the market adjustment computer model (e.g., via the market adjustment module 270) to generate, based on at least one of the engagement data, the behavioral information of the user or the contextual information associated with the user, the one or more market adjustment recommendations including an advertisement of the replacement item. In one or more other embodiments, the online concierge system 140 may apply the market adjustment computer model (e.g., via the market adjustment module 270) to generate, based on at least one of the engagement data, the behavioral information of the user or the contextual information associated with the user, the one or more market adjustment recommendations including a recommendation for adjusting stocking of at least one of the requested item or the replacement item. In one or more other embodiments, the online concierge system 140 may apply the market adjustment computer model (e.g., via the market adjustment module 270) to generate, based on at least one of the engagement data, the behavioral information of the user or the contextual information associated with the user, the one or more market adjustment recommendations including one or more real time messages for the retailer in relation to the replacement item.

The online concierge system 140 provides 450 (e.g., via the market adjustment module 270), via a network (e.g., the network 130), the one or more market adjustment recommendations to a computing system associated with the retailer (e.g., the retailer computing system 120) prompting the retailer to perform one or more market adjustment actions. The online concierge system 140 may provide (e.g., via the market adjustment module 270) the one or more market adjustment recommendations to the computing system associated with the retailer prompting the retailer to perform the one or more market adjustment actions including at least one of: adjusting a stock of one or more items, generating advertisements for the one or more items, providing discount coupons for conversion of the one or more items, or generating one or more new items.

The online concierge system 140 may collect (e.g., via the machine-learning training module 230) data with information about one or more actions conducted by the retailer in response to the one or more market adjustment recommendations provided to the retailer. The online concierge system 140 may re-train the market adjustment computer model by updating (e.g., via the machine-learning training module 230), using the collected data, a set of parameters of the market adjustment computer model.

Embodiments of the present disclosure are directed to the online concierge system 140 that uses information from the replacement flow to train a computer model to predict whether a user can be moved from conversion an item A to conversion of an item B. Additionally, the trained computer model may generate various market adjustment recommendations for a retailer associated with the online concierge system 140 so that the retailer can perform one or more actions in response to the market adjustment recommendations.

Additional Considerations

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated for the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method, performed at a computer system comprising a processor and a computer-readable medium having instructions executed by the processor, comprising:

receiving, via a network and from a device associated with a user, a request for an item submitted by the user via a user interface of the device associated with the user;

responsive to receiving the request and initiated by the processor executing the instructions, searching through a database of the computer system by an order management module of the computer system to identify that the item is unavailable at an entity;

upon identifying that the item is unavailable, accessing an item replacement model, wherein the item replacement model is a machine-learning model trained to generate a replacement score for each candidate replacement item from a set of candidate replacement items;

applying, by an item replacement module of the computer system initiated by the processor executing the instructions, the item replacement model to user data associated with the user and one or more features for each candidate replacement item to generate the replacement score for each candidate replacement item;

selecting, using the replacement score for each candidate replacement item, a replacement item from the set of candidate replacement items;

causing, by a content presentation module of the computer system initiated by the processor executing the instructions, a user interface of the device associated with the user to display the replacement item for recommendation to the user and inclusion into a cart;

receiving, in real time via the network and from the device associated with the user, engagement data with information about an engagement of the user with the replacement item via the user interface;

collecting, by a data gathering module of the computer system initiated by the processor executing the instructions, chat data exchanged between the device associated with the user and a device associated with a picker who is servicing an order placed by the user via the user interface of the device associated with the user;

applying, by an adjustment module of the computer system initiated by the processor executing the instructions, a natural language processing to the chat data to extract activity information of the user;

accessing an adjustment model, wherein the adjustment model is a machine-learning model trained to:

generate a score for the user indicative of an affinity of the user in relation to the replacement item, and generate a real time alert for the entity;

applying, by the adjustment module initiated by the processor executing the instructions, the adjustment model to the engagement data, the activity information of the user, and contextual information associated with the user to generate the score for the user and the real time alert for the entity; and communicating, via the network and from the adjustment module, the real time alert to a computing system associated with the entity prompting the entity to perform one or more immediate actions.

2. The method of claim 1, further comprising:

clustering, using the score for the user, the user into a cluster of users, each user in the cluster of users associated with a likelihood of switching from a conversion of the item to a conversion of the replacement item greater than a threshold value; and storing, in the database, information about the cluster of users.

3. The method of claim 1, further comprising:

generating the activity information of the user, wherein the activity information comprises at least one of: information about a brand of the replacement item converted by the user relative to a brand of the item, information about a type of the replacement item converted by the user relative to a type of the item, a discussion between the user and a picker during a fulfillment process associated with the replacement item, information about a future reordering of the replacement item by the user, or an appeasement request from the user associated with the item.

4. The method of claim 1, further comprising:

generating the contextual information associated with the user, wherein the contextual information comprises at least one of: demographic information about the user, a timestamp when the request for the item was made, content of the cart, or information about one or more other replacement items included in the cart.

5. The method of claim 1, wherein applying the adjustment model further comprises:

applying the adjustment model to the engagement data, the activity information of the user and the contextual information associated with the user to generate the real time alert including information about one or more reasons for the user declining to convert the replacement item.

6. The method of claim 1, wherein applying the adjustment model further comprises:

applying the adjustment model to the engagement data, the activity information of the user and the contextual information associated with the user to generate the real time alert including a recommendation for generating a coupon for incentivizing a conversion of the replacement item.

7. The method of claim 1, wherein applying the adjustment model further comprises:

applying the adjustment model to the engagement data, the activity information of the user and the contextual information associated with the user to generate the real time alert including a recommendation for at least one of branding or advertising a group of items including the replacement item which was converted by the user.

8. The method of claim 1, wherein applying the adjustment model further comprises:

applying the adjustment model to the engagement data, the activity information of the user and the contextual information associated with the user to generate the real time alert including a recommendation for the entity to combine the replacement item with one or more other items into a single item.

9. The method of claim 1, wherein applying the adjustment model further comprises:

applying the adjustment model to the engagement data, the activity information of the user and the contextual information associated with the user to generate the real time alert including an advertisement of the replacement item.

10. The method of claim 1, wherein applying the adjustment model further comprises:

applying the adjustment model to the engagement data, the activity information of the user and the contextual information associated with the user to generate the real time alert including a recommendation for adjusting stocking of at least one of the item or the replacement item.

11. The method of claim 1, further comprising:

collecting data with information about one or more actions conducted by the entity in response to the real time alert; and re-training the adjustment model by updating, using the collected data, a set of parameters of the adjustment model.

12. The method of claim 1, wherein communicating the real time alert comprises:

communicating the real time alert to the computing system associated with the entity prompting the entity to perform the one or more immediate actions including at least one of adjusting a stock of one or more items, generating advertisements for the one or more items, providing discount coupons for conversion of the one or more items, or generating one or more new items.

13. A computer program product comprising a non-transitory computer readable storage medium having instructions encoded thereon that, when executed by a processor of a computer system, cause the processor to perform steps comprising:

receiving, via a network and from a device associated with a user, a request for an item submitted by the user via a user interface of the device associated with the user;

responsive to receiving the request and initiated by the processor executing the instructions, searching through a database of the computer system by an order management module of the computer system to identify that the item is unavailable at an entity;

upon identifying that the item is unavailable, accessing an item replacement model, wherein the item replacement model is a machine-learning model trained to generate a replacement score for each candidate replacement item from a set of candidate replacement items;

applying, by an item replacement module of the computer system initiated by the processor executing the instructions, the item replacement model to user data associated with the user and one or more features for each candidate replacement item to generate the replacement score for each candidate replacement item;

selecting, using the replacement score for each candidate replacement item, a replacement item from the set of candidate replacement items;

causing, by a content presentation module of the computer system initiated by the processor executing the instructions, a user interface of the device associated with the user to display the replacement item for recommendation to the user and inclusion into a cart;

receiving, in real time via the network and from the device associated with the user, engagement data with information about an engagement of the user with the replacement item via the user interface;

collecting, by a data gathering module of the computer system initiated by the processor executing the instructions, chat data exchanged between the device associated with the user and a device associated with a picker who is servicing an order placed by the user via the user interface of the device associated with the user;

applying, by an adjustment module of the computer system initiated by the processor executing the instructions, a natural language processing to the chat data to extract activity information of the user;

accessing a an adjustment model, wherein the adjustment model is a machine-learning model trained to:

generate a score for the user indicative of an affinity of the user in relation to the replacement item, and generate a real time alert for the entity;

applying, by the adjustment module initiated by the processor executing the instructions, the adjustment model to the engagement data, the activity information of the user, and contextual information associated with the user to generate the score for the user and the real time alert for the entity; and communicating, via the network and from the adjustment module, the real time alert to a computing system associated with the entity prompting the entity to perform one or more immediate actions.

14. The computer program product of claim 13, wherein the instructions further cause the processor to perform steps comprising:

clustering, using the score for the user, the user into a cluster of users, each user in the cluster of users associated with a likelihood of switching from a conversion of the item to a conversion of the replacement item greater than a threshold value; and storing, in the database, information about the cluster of users.

15. The computer program product of claim 13, wherein the instructions further cause the processor to perform steps comprising:

applying the adjustment model to the engagement data, the activity information of the user and the contextual information associated with the user to generate the real time alert including information about one or more reasons for the user declining to convert the replacement item.

16. The computer program product of claim 13, wherein the instructions further cause the processor to perform steps comprising:

applying the adjustment model to the engagement data, the activity information of the user and the contextual information associated with the user to generate the real time alert including a recommendation for the entity to combine the replacement item with one or more other items into a single item.

17. The computer program product of claim 13, wherein the instructions further cause the processor to perform steps comprising:

applying the adjustment model to the engagement data, the activity information of the user and the contextual information associated with the user to generate the real time alert including a recommendation for adjusting stocking of at least one of the item or the replacement item.

18. The computer program product of claim 13, wherein the instructions further cause the processor to perform steps comprising:

collecting data with information about one or more actions conducted by the entity in response to the real time alert; and re-training the adjustment model by updating, using the collected data, a set of parameters of the adjustment model.

19. A computer system comprising:

a processor; and a non-transitory computer-readable storage medium having instructions that, when executed by the processor, cause the computer system to perform steps comprising:

receiving, via a network and from a device associated with a user, a request for an item submitted by the user via a user interface of the device associated with the user;

responsive to receiving the request and initiated by the processor executing the instructions, searching through a database of the computer system by an order management module of the computer system to identify that the item is unavailable at an entity;

upon identifying that the item is unavailable, accessing an item replacement model, wherein the item replacement model is a machine-learning model trained to generate a replacement score for each candidate replacement item from a set of candidate replacement items;

applying, by an item replacement module of the computer system initiated by the processor executing the instructions, the item replacement model to user data associated with the user and one or more features for each candidate replacement item to generate the replacement score for each candidate replacement item;

selecting, using the replacement score for each candidate replacement item, a replacement item from the set of candidate replacement items;

causing, by a content presentation module of the computer system initiated by the processor executing the instructions, a user interface of the device associated with the user to display the replacement item for recommendation to the user and inclusion into a cart;

receiving, in real time via the network and from the device associated with the user, engagement data with information about an engagement of the user with the replacement item via the user interface;

collecting, by a data gathering module of the computer system initiated by the processor executing the instructions, chat data exchanged between the device associated with the user and a device associated with a picker who is servicing an order placed by the user via the user interface of the device associated with the user;

applying, by an adjustment module of the computer system initiated by the processor executing the instructions, a natural language processing to the chat data to extract activity information of the user;

accessing an adjustment model, wherein the adjustment model is a machine-learning model trained to:

generate a score for the user indicative of an affinity of the user in relation to the replacement item, and generate a real time alert for the entity;

applying, by the adjustment module initiated by the processor executing the instructions, the adjustment model to the engagement data, the activity information of the user, and contextual information associated with the user to generate the score for the user and the real time alert for the entity; and communicating, via the network and from the adjustment module, the real time alert to a computing system associated with the entity prompting the entity to perform one or more immediate actions.

* * * * *